(12) United States Patent
Xu et al.

(10) Patent No.: US 9,706,161 B2
(45) Date of Patent: Jul. 11, 2017

(54) RESOLUTION CONVERSION METHOD AND DEVICE, UHDTV

(71) Applicant: SHENZHEN SKYWORTH-RGB ELECTRONIC CO., LTD., Shenzhen, Guangdong (CN)

(72) Inventors: Yaoling Xu, Shenzhen (CN); Zhilong Hou, Shenzhen (CN)

(73) Assignee: SHENZHEN SKYWORTH-RGB ELECTRONIC CO., LTD., Shenzhen (CN)

( * ) Notice: Subject to any disclaimer, the term of this patent is extended or adjusted under 35 U.S.C. 154(b) by 190 days.

(21) Appl. No.: 14/411,397

(22) PCT Filed: Oct. 23, 2013

(86) PCT No.: PCT/CN2013/085806
§ 371 (c)(1),
(2) Date: Dec. 26, 2014

(87) PCT Pub. No.: WO2014/139289
PCT Pub. Date: Sep. 18, 2014

(65) Prior Publication Data
US 2015/0181158 A1      Jun. 25, 2015

(30) Foreign Application Priority Data

Mar. 11, 2013   (CN) .......................... 2013 1 0076759

(51) Int. Cl.
*H04N 7/01*   (2006.01)
*G06T 3/40*   (2006.01)

(52) U.S. Cl.
CPC ......... *H04N 7/0117* (2013.01); *G06T 3/4007* (2013.01)

(58) Field of Classification Search
CPC .... H04N 7/015; H04N 7/0152; H04N 7/0155; H04N 7/0117; H04N 7/0125;
(Continued)

(56) References Cited

U.S. PATENT DOCUMENTS

| 6,760,489 B1* | 7/2004 | Kuwata | G06T 3/4007 358/443 |
| 2005/0200733 A1* | 9/2005 | Malvar | G06T 3/4015 348/272 |

(Continued)

*Primary Examiner* — Michael Lee

(57) ABSTRACT

The present invention provides a resolution conversion method and device, and UHDTV. The resolution conversion method includes the following steps: acquiring a diagonal interpolation parameter matrix in the vertical direction and a diagonal interpolation parameter matrix in the horizontal direction; performing a diagonal interpolation processing to the input signal that the resolution thereof is to be converted to acquire a target resolution signal on basis of the diagonal interpolation parameter matrix in the vertical direction and the diagonal interpolation parameter matrix in the horizontal direction. By performing a diagonal interpolation processing to the input signal that the resolution thereof is to be conversed according to the diagonal interpolation parameter matrix in the horizontal and vertical directions, on one hand, image distortion is reduced, and on the other hand, image blur and image aliasing can be effectively avoid, and clarity of the image is thus improved.

12 Claims, 9 Drawing Sheets

(58) Field of Classification Search
CPC ......... H04N 7/0135; G06T 3/40; G06T 3/403; G06T 5/003; G06T 3/4007
USPC ........................................................ 348/441
See application file for complete search history.

(56) References Cited

U.S. PATENT DOCUMENTS

| | | | |
|---|---|---|---|
| 2009/0128662 A1* | 5/2009 | Moon .................... | H04N 5/217 348/231.99 |
| 2010/0246998 A1* | 9/2010 | He ....................... | H04N 19/593 382/300 |
| 2012/0033736 A1* | 2/2012 | Sato ........................ | G06T 9/004 375/240.16 |
| 2014/0201776 A1* | 7/2014 | Minemura ......... | H04N 21/2541 725/25 |

* cited by examiner

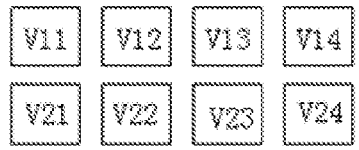

Fig. 2-3

| Performing a diagonal sampling processing in the horizontal direction to the first resolution signal to acquire a second resolution signal | S21 |

| Performing a diagonal interpolation parameter calculation in the horizontal direction in accordance with an interpolation algorithm on the basis of the first resolution signal and the second resolution signal, to acquiring the diagonal interpolation parameter matrix in the horizontal direction | S22 |

Fig. 3

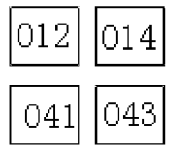

Fig. 3-1

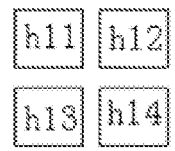

Fig. 3-2

| Performing a diagonal interpolation processing in the horizontal direction to the input signal that the resolution thereof is to be conversed according to the diagonal interpolation parameter matrix in the horizontal direction, to acquiring a third resolution signal | — S31 |

| Performing a diagonal interpolation processing in the vertical direction to the third resolution signal according to the diagonal interpolation parameter matrix in the vertical direction, to acquiring the target resolution signal | — S32 |

Pixel block A11    Pixel block A12

Pixel block A21    Pixel block A22

Fig. 4-2

| x11 | o11 | x12 | o12 | x13 | o13 | x14 | o14 |
|---|---|---|---|---|---|---|---|
| o21 | x21 | o22 | x22 | o23 | x23 | o24 | x24 |
| x31 | o31 | x32 | o32 | x33 | o33 | x34 | o34 |
| o41 | x41 | o42 | x42 | o43 | x43 | o44 | x44 |

Fig. 4-3

|  | o11 |  | o12 |  | o13 |  | o14 |
|---|---|---|---|---|---|---|---|
| X11 |  | X12 |  | X13 |  | X14 |  |
|  | X21 |  | X22 |  | X23 |  | X24 |
| o21 |  | o22 |  | o23 |  | o24 |  |
|  | o31 |  | o32 |  | o33 |  | o34 |
| X31 |  | x32 |  | x33 |  | x34 |  |
|  | x41 |  | x42 |  | X43 |  | x44 |
| o41 |  | o42 |  | o43 |  | o44 |  |

Fig. 4-4

| | Pixel block B11 | | Pixel block B12 | | Pixel block B13 | | Pixel block B14 |
|---|---|---|---|---|---|---|---|
| | O11 | | O12 | | O13 | | O14 |
| X11 | | X12 | | X13 | | X14 | |
| | X21 | | X22 | | X23 | | X24 |
| O21 | | O22 | | O23 | | O24 | |
| | O31 | | O32 | | O33 | | O34 |
| X31 | | X32 | | X33 | | X34 | |
| | X41 | | X42 | | X43 | | X44 |
| O41 | | O42 | | O43 | | O44 | |
| Pixel block B21 | | Pixel block B22 | | Pixel block B23 | | Pixel block B24 | |

Fig. 4-5

| Y11 | O11 | Y12 | O12 | Y13 | O13 | Y14 | O14 |
|---|---|---|---|---|---|---|---|
| X11 | Y21 | X12 | Y22 | X13 | Y23 | X14 | Y24 |
| Y31 | X21 | Y32 | X22 | Y33 | X23 | Y34 | X24 |
| O21 | Y41 | O22 | Y42 | O23 | Y43 | O24 | Y44 |
| Y51 | O31 | Y52 | O32 | Y53 | O33 | Y54 | O34 |
| X31 | Y61 | X32 | Y62 | X33 | Y63 | X34 | Y64 |
| Y71 | X41 | Y72 | X42 | Y73 | X43 | Y74 | X44 |
| O41 | Y81 | O42 | Y82 | O43 | Y83 | O44 | Y84 |

Fig. 4-6

RESOLUTION CONVERSION METHOD AND DEVICE, UHDTV

BACKGROUND

1. Technical Field

The present invention relates to display technology field and, particularly, to a resolution conversion method and device, and an ultra-high definition television (UHDTV).

2. Description of Related Art

UHDTV is a kind of television that the pixel thereof reaches 3840×2160 (4K×2K) or even 7680×4320 (8K×4K). Compared with full high definition television (FHDTV) which has 1920×1080 (2K×1K) pixel, the pixel of UHDTV is 4 times or even 16 times increased, which leads to a clear and delicate display thereon. The standers of UHDTV established by the ITU-R includes a stander of 4K×2K and a stander of 8K×4K. As it is easy to be implemented and popularized than UHDTV of 8K×4K, UHDTV of 4K×2K is now the focus of television and the focus and orientation of the television industry.

As signal of 2K×1K is rich and the source is adequate, signal of 4K×2K is less and the source is lack, and further the cost of generating 4K×2K source directly is high, when the present UHDTV displays signal of 2K×1K, image distortion, jagged, fuzzy, and so on often exist. Thus, there is a need to convert signal of 2K×1K to be signal of 4K×2K.

BRIEF SUMMARY

The present mainly provides a resolution conversion method which aims to enhance the clarity of UHDTV.

An embodiment of the present invention provides a resolution conversion method, comprising:

acquiring a diagonal interpolation parameter matrix in the vertical direction and a diagonal interpolation parameter matrix in the horizontal direction;

performing a diagonal interpolation processing to the input signal that the resolution thereof is to be conversed to acquire a target resolution signal on basis of the diagonal interpolation parameter matrix in the vertical direction and the diagonal interpolation parameter matrix in the horizontal direction.

Preferably, said acquiring the diagonal interpolation parameter matrix in the vertical direction comprising:

performing a diagonal sampling processing in the vertical direction to the signal that the resolution thereof is to be conversed to acquire a first resolution signal;

performing a diagonal interpolation parameter calculation in the vertical direction in accordance with an interpolation algorithm on the basis of the signal that the resolution thereof is to be conversed and the first resolution signal, to acquiring the diagonal interpolation parameter matrix in the vertical direction.

Preferably, said acquiring the diagonal interpolation parameter matrix in the horizontal direction comprising:

performing a diagonal sampling processing in the horizontal direction to the first resolution signal to acquire a second resolution signal.

performing a diagonal interpolation parameter calculation in the horizontal direction in accordance with an interpolation algorithm on the basis of the first resolution signal and the second resolution signal, to acquiring the diagonal interpolation parameter matrix in the horizontal direction.

Preferably, said performing a diagonal interpolation processing to the signal that the resolution thereof is to be conversed to acquire a target resolution signal on basis of the diagonal interpolation parameter matrix in the vertical direction and the diagonal interpolation parameter matrix in the horizontal direction comprising:

performing a diagonal interpolation processing in the horizontal direction to the signal that the resolution thereof is to be conversed according to the diagonal interpolation parameter matrix in the horizontal direction, to acquiring a third resolution signal;

performing a diagonal interpolation processing in the vertical direction to the third resolution signal according to the diagonal interpolation parameter matrix in the vertical direction, to acquiring the target resolution signal.

Preferably, said performing a diagonal interpolation processing in the horizontal direction to the signal that the resolution thereof is to be conversed according to the diagonal interpolation parameter matrix in the horizontal direction, to acquiring a third resolution signal comprising:

performing a horizontal diagonal filling to pixels of a pixel matrix of the signal that the resolution thereof is to be conversed to acquire a first matrix;

dividing the first matrix; and performing a horizontal diagonal interpolation calculation to the filled pixels of the first matrix and the diagonal interpolation parameter matrix in the horizontal direction, and filling the calculated pixel values to corresponding vacancies in the first matrix to acquire the third resolution signal;

said performing a diagonal interpolation processing in the vertical direction to the third resolution signal according to the diagonal interpolation parameter matrix in the vertical direction, to acquiring the target resolution signal comprising:

performing a vertical diagonal filling to pixels of a pixel matrix of the third resolution signal to acquire a second matrix;

dividing the second matrix;

performing a vertical diagonal interpolation calculation to the filled pixels of the second matrix and the diagonal interpolation parameter matrix in the vertical direction, and filling the calculated pixel values to corresponding vacancies in the second matrix to acquire the target resolution signal.

An embodiment of the present invention provides a resolution converting device, comprising:

a vertical diagonal interpolation parameter acquiring module configured for acquiring a diagonal interpolation parameter matrix in the vertical direction;

a horizontal diagonal interpolation parameter acquiring module configured for acquiring a diagonal interpolation parameter matrix in the horizontal direction; and a target resolution signal acquiring module configure for performing a diagonal interpolation processing to the signal that the resolution thereof is to be conversed to acquire a target resolution signal on basis of the diagonal interpolation parameter matrix in the vertical direction and the diagonal interpolation parameter matrix in the horizontal direction.

Preferably, the vertical diagonal interpolation parameter acquiring module comprises:

a vertical diagonal sampling module configured for performing a diagonal sampling processing in the vertical direction to the signal that the resolution thereof is to be conversed to acquire a first resolution signal; and a vertical diagonal interpolation parameter acquiring module configured for performing a diagonal interpolation parameter calculation in the vertical direction in accordance with an interpolation algorithm on the basis of the signal that the resolution thereof is to be conversed and the first resolution signal, to acquiring the diagonal interpolation parameter matrix in the vertical direction.

Preferably, the horizontal diagonal interpolation parameter acquiring module comprises:

a horizontal diagonal sampling module configured for performing a diagonal sampling processing in the horizontal direction to the first resolution signal to acquire a second resolution signal; and a horizontal diagonal interpolation parameter acquiring module configured for performing a diagonal interpolation parameter calculation in the horizontal direction in accordance with an interpolation algorithm on the basis of the first resolution signal and the second resolution signal, to acquiring the diagonal interpolation parameter matrix in the horizontal direction.

Preferably, the target resolution signal acquiring module comprises:

a horizontal diagonal interpolating module configured for performing a diagonal interpolation processing in the horizontal direction to the signal that the resolution thereof is to be conversed according to the diagonal interpolation parameter matrix in the horizontal direction, to acquiring a third resolution signal; and a vertical diagonal interpolating module configured for performing a diagonal interpolation processing in the vertical direction to the third resolution signal according to the diagonal interpolation parameter matrix in the vertical direction, to acquiring the target resolution signal.

Preferably, the target resolution signal acquiring module further comprises:

a frame buffering unit configured for performing a delay buffering processing to the signal that the resolution thereof is to be conversed and that is input into the horizontal diagonal interpolating module.

Preferably, the target resolution signal acquiring module further comprises:

an edge identifying and enhancing module configure for performing an edge identifying and edge enhancing processing to the target resolution signal acquired by the vertical diagonal interpolating module.

An embodiment of the present invention provides an Ultra High-Definition Television, comprising:

a decoder configured for decoding and converting received signal, and outputting 2K×1K progressive signal of YUV format:

a resolution converting device of anyone of the claims 6 to 11, configured for converting the 2K×1K progressive signal of YUV format to be 4K×2K progressive signal of YUV format;

a driving device configured for performing color temperature adjust, GAMMA calibration, color space reverse conversion, and double frequency and frame interpolating process to the 4K×2K progressive signal of YUV format, and outputting a 4K×2K double frequency progressive signal of RGB format; and a saving and controlling device configured for controlling the decoder, resolution converting device, and driving device, and saving data of the decoder, resolution converting device, and driving device.

In the resolution conversion method of the present invention, by performing a diagonal interpolation processing to the input signal that the resolution thereof is to be conversed according to the diagonal interpolation parameter matrix in the horizontal and vertical directions, on one hand, image distortion is reduced, and on the other hand, image blur and image aliasing can be effectively avoid, and clarity of the image is thus improved.

BRIEF DESCRIPTION OF THE DRAWINGS

FIG. 2-1 is a schematic diagram showing an input signal that the resolution thereof is to be conversed and that is of 2K×1K progressive signal of YUV format;

FIG. 2-2 is schematic diagram showing a 2K×0.5K diagonal interpolation sample signal in the vertical direction of YUV format which is acquiring by performing a diagonal sampling processing to the signal of FIG. 2-1;

FIG. 2-3 is schematic diagram showing a diagonal interpolation parameter matrix V in the vertical direction which is acquiring by performing a diagonal interpolation parameter calculation in the vertical direction to the signal of FIGS. 2-1 and 2-2;

FIG. 3 is flow chart of acquiring a diagonal interpolation parameter matrix in the horizontal direction in accordance with the preferable embodiment of the present invention;

FIG. 3-1 is a schematic diagram showing a 1K×0.5K diagonal interpolation sample signal in the horizontal direction of YUV format which is acquiring by performing a diagonal sampling processing to the signal of FIG. 2-2;

FIG. 3-2 is schematic diagram showing a diagonal interpolation parameter matrix H in the horizontal direction which is acquiring by performing a diagonal interpolation parameter calculation in the horizontal direction to the signal of FIGS. 2-2 and 3-1;

FIG. 4 is a flow chart of acquiring a target resolution signal in accordance with the preferable embodiment of the present invention;

FIG. 4-1 is a schematic diagram showing a matrix which is acquired by performing a horizontal diagonal filling to the pixel matrix shown in FIG. 2-1;

FIG. 4-2 is a schematic diagram showing a pixel block matrix which is acquired by dividing the pixel matrix shown in FIG. 4-1;

FIG. 4-3 is a schematic diagram showing a matrix which is acquired by performing a diagonal filling to the matrix shown in FIG. 4-2;

FIG. 4-4 is a schematic diagram showing a matrix which is acquired by performing a vertical diagonal filling to the matrix shown in FIG. 4-3;

FIG. 4-5 is a schematic diagram showing a pixel block matrix which is acquired by dividing the matrix shown in FIG. 4-4;

FIG. 4-6 is a schematic diagram showing a matrix which is acquired by performing a diagonal filling to the matrix shown in FIG. 4-5;

FIG. 5 is a schematic diagram showing a resolution conversion device in accordance with a preferable embodiment of the present invention; and FIG. 6 is a schematic diagram showing a UHDTV in accordance with a preferable embodiment of the present invention.

DETAILED DESCRIPTION

Technical solutions of the present invention will be described in detail with reference to embodiments and attached drawings. It should be understood that the embodiments described below are just for explain the present invention, without any limitation of the present invention.

Figure 1:
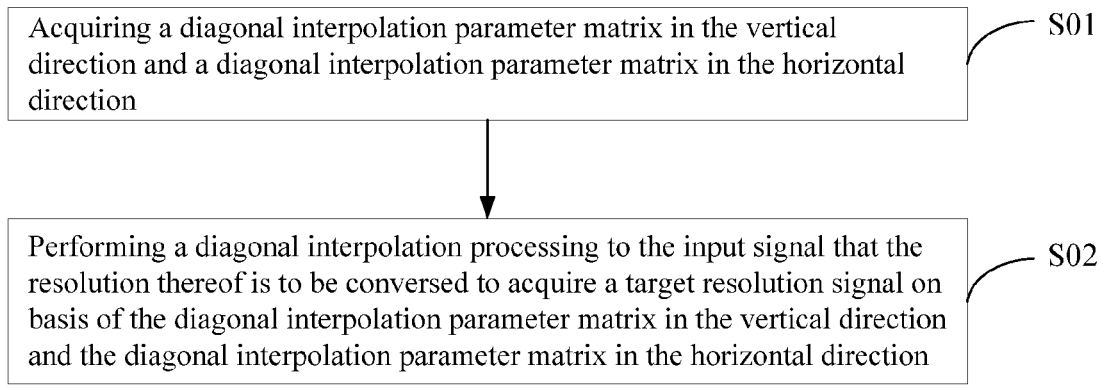
FIG. 1 is a flow chart of a resolution conversion method in accordance with a preferable embodiment of the present invention.

The present invention discloses a resolution conversion method. Referring to FIG. 1, the resolution conversion method includes the following steps:

Step S01: acquiring a diagonal interpolation parameter matrix in the vertical direction and a diagonal interpolation parameter matrix in the horizontal direction.

Step S02: performing a diagonal interpolation processing to the input signal that the resolution thereof is to be conversed to acquire a target resolution signal on basis of the diagonal interpolation parameter matrix in the vertical direction and the diagonal interpolation parameter matrix in the horizontal direction.

Figure 2:
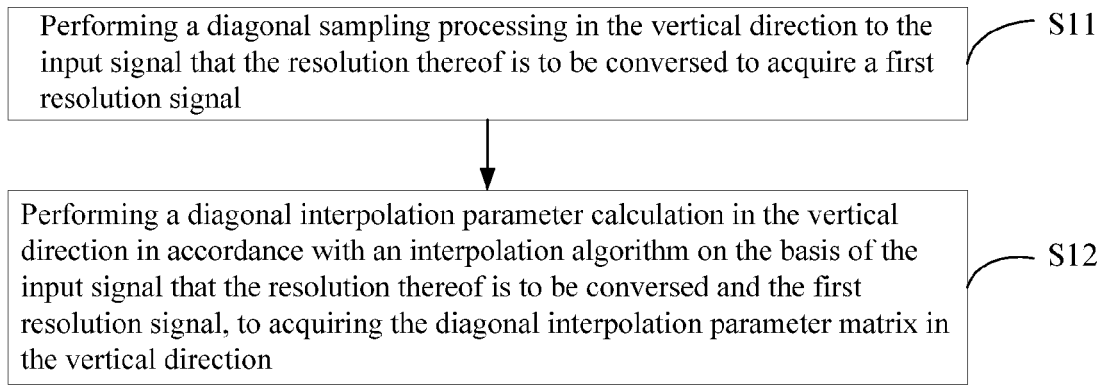
FIG. 2 is flow chart of acquiring a diagonal interpolation parameter matrix in the vertical direction in accordance with the preferable embodiment of the present invention.
Figures 1, 2:
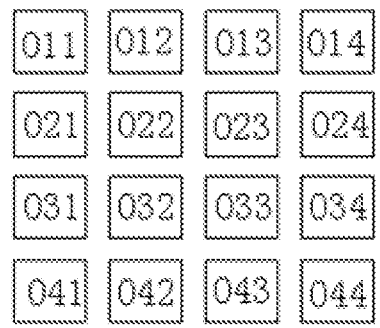
Figure 2:

For acquiring the diagonal interpolation parameter matrix in the vertical direction and a diagonal interpolation parameter matrix in the horizontal direction, in specific embodiment, referring to FIG. 2, the step of acquiring the diagonal interpolation parameter matrix in the vertical direction specifically includes:

Step S11: performing a diagonal sampling processing in the vertical direction to the input signal that the resolution thereof is to be conversed to acquire a first resolution signal.

Step S12: performing a diagonal interpolation parameter calculation in the vertical direction in accordance with an interpolation algorithm on the basis of the input signal that the resolution thereof is to be conversed and the first resolution signal, to acquiring the diagonal interpolation parameter matrix in the vertical direction.

Referring to FIG. 2-1, when the input signal that the resolution thereof is to be converted is the 2K×1K progressive signal of YUV format, in the vertical direction, performing the diagonal sampling processing to the 2K×1K progressive signal of YUV format, so that it is processed to be 2K×0.5K diagonal interpolation sample signal in the vertical direction of YUV format. The processed 2K×0.5K diagonal interpolation sample signal in the vertical direction of YUV format can be referred to in FIG. 2-2. Then, performing a diagonal interpolation parameter calculation in the vertical direction to the input signal that the resolution thereof is to be conversed and that is of 2K×1K progressive signal of YUV format and the processed 2K×0.5K diagonal interpolation sample signal in the vertical direction of YUV format according to the interpolation algorithm. After calculation, the diagonal interpolation parameter matrix V is acquired, which can be referred to in FIG. 2-3.

Referring to FIG. 3, acquiring the diagonal interpolation parameter matrix in the horizontal direction specifically includes:

Step S21: performing a diagonal sampling processing in the horizontal direction to the first resolution signal to acquire a second resolution signal.

Step S22: performing a diagonal interpolation parameter calculation in the horizontal direction in accordance with an interpolation algorithm on the basis of the first resolution signal and the second resolution signal, to acquiring the diagonal interpolation parameter matrix in the horizontal direction.

The first resolution signal is shown in FIG. 2-2, in the horizontal direction, performing the diagonal sampling processing to the 2K×0.5K progressive signal of YUV format, so that it is processed to be 1K×0.5K diagonal interpolation sample signal in the horizontal direction of YUV format. The processed 1K×0.5K diagonal interpolation sample signal in the horizontal direction of YUV format can be referred to in FIG. 3-1. Then, performing a diagonal interpolation parameter calculation in the horizontal direction to the 2K×0.5K diagonal interpolation sample signal in the vertical direction of YUV format and the processed 1K×0.5K diagonal interpolation sample signal in the horizontal direction of YUV format according to the interpolation algorithm. After calculation, the diagonal interpolation parameter matrix H is acquired, which can be referred to in FIG. 3-2.

In other embodiment, acquiring the diagonal interpolation parameter matrix in the vertical direction and the diagonal interpolation parameter matrix in the horizontal direction is not limited to the above embodiment. For example, acquiring the diagonal interpolation parameter matrix in the horizontal direction can specifically be:

performing a diagonal sampling processing in the horizontal direction to the input signal that the resolution thereof is to be conversed to acquire a fourth resolution signal;

performing a diagonal interpolation parameter calculation in the horizontal direction in accordance with an interpolation algorithm on the basis of the input signal that the resolution thereof is to be conversed and the fourth resolution signal, to acquire a diagonal interpolation parameter matrix in the horizontal direction.

Accordingly, acquiring the diagonal interpolation parameter matrix in the vertical direction can specifically be:

performing a diagonal sampling processing in the vertical direction to the fourth resolution signal to acquire a fifth resolution signal;

performing a diagonal interpolation parameter calculation in the vertical direction in accordance with an interpolation algorithm on the basis of the fourth resolution signal and the fifth resolution signal, to acquire a diagonal interpolation parameter matrix in the vertical direction.

Referring to FIG. 4, acquiring the target resolution signal specifically includes:

Step S31: performing a diagonal interpolation processing in the horizontal direction to the input signal that the resolution thereof is to be conversed according to the diagonal interpolation parameter matrix in the horizontal direction, to acquiring a third resolution signal;

Step S32: performing a diagonal interpolation processing in the vertical direction to the third resolution signal according to the diagonal interpolation parameter matrix in the vertical direction, to acquiring the target resolution signal.

Specifically, referring the FIG. 2-1, when the input signal that the resolution thereof is to be converted is the 2K×1K progressive signal of YUV format, 1. performing a horizontal diagonal filling to the pixels of the 2K×1K pixel matrix to acquire a matrix PH, which can be referred to in FIG. 4-1.

2. dividing the matrix PH, that is, dividing a 4K×1K matrix into four 1K×0.5K pixel block matrixes each of which has 4×2 pixels, which can be referred to in FIG. 4-2, wherein the 32 pixels are divided into four pixel block matrixes A11, A12, A21, and A22 along the dotted lines.

3. performing a horizontal diagonal interpolation calculation to the filled pixels of the matrix PH and a diagonal interpolation parameter matrix H in the horizontal direction, and filling the calculated pixel values to corresponding vacancies in the matrix PH to acquire a third resolution signal. The matrix after diagonal sampling processing in the horizontal direction can be referred to in FIG. 4-3.

4. performing a vertical diagonal filling to the pixels of the 4K×1K matrix PH to acquire a matrix PV which can be referred to in FIG. 4-4.

Figure 5:
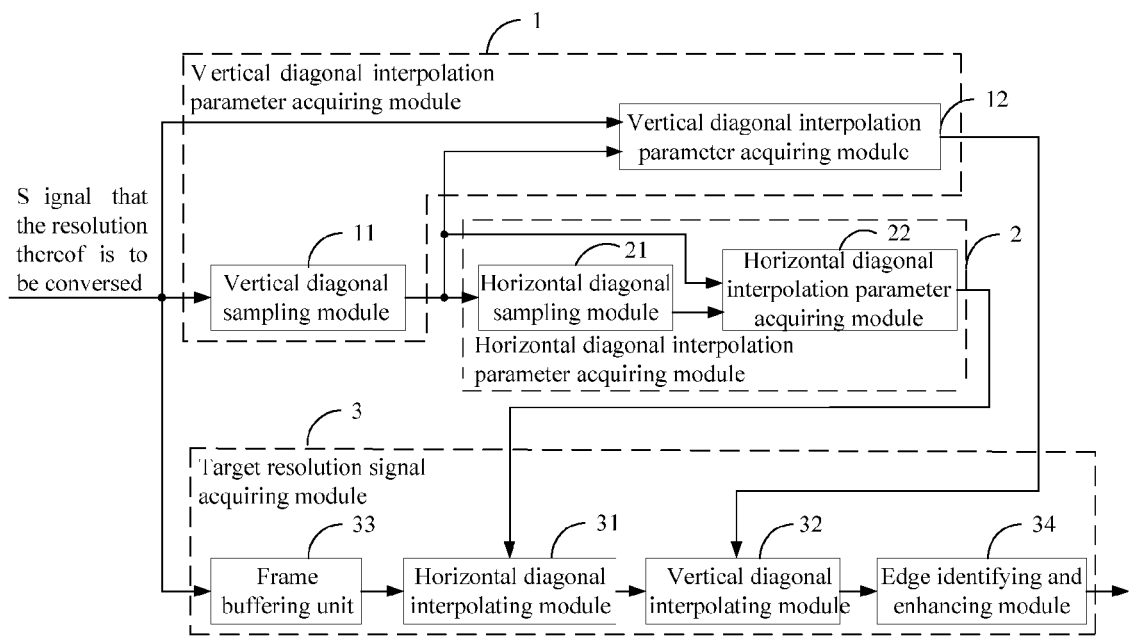

5. dividing the matrix PV, that is, dividing the 4K×2K matrix into eight 2K×0.5K pixel block matrixes each of which has 4×2 pixels, which can be referred to in FIG. 4-5, wherein the 64 pixels are divided into eight pixel block matrixes B11, B12, B13, B14, B21, B22, B23, and B24 along the dotted lines.

6. performing a vertical diagonal interpolation calculation to the filled pixels of the matrix PV and a diagonal interpolation parameter matrix H in the vertical direction, and filling the calculated pixel values to corresponding vacancies in the matrix PV to acquire a target resolution signal. The matrix after diagonal sampling processing in the vertical direction can be referred to in FIG. 4-6.

In other embodiment, acquiring the target resolution signal is not limited to the above embodiment. For example, acquiring the target resolution signal can specifically be:

performing a diagonal interpolation processing in the vertical direction to the input signal that the resolution thereof is to be conversed according to the diagonal interpolation parameter matrix in the vertical direction, to acquire a six resolution signal;

performing a diagonal interpolation processing in the horizontal direction to the six resolution signal according to the diagonal interpolation parameter matrix in the horizontal direction, to acquire the target resolution signal.

In preferred embodiment, before performing a horizontal diagonal filling to the input signal that the resolution thereof is to be conversed to acquire the matrix PH, the following step is further included: performing a delay buffering processing to the input signal that the resolution thereof is to be conversed.

Further, after acquiring the target resolution signal, the following step is further included: performing an edge identifying and edge enhancing processing to the target resolution signal.

The resolution conversion method of the present invention is capable of converting 2K×1K signal to be 4K×2K signal, however it is not limited to the above described signals, for example, converting 4K×2K signal to be 8K×4K signal.

To sum up, the resolution conversion method of the present invention is capable of converting 2K×1K signal to be 4K×2K signal. By diagonal interpolating in the horizontal direction and the vertical direction in serial, image blur and image aliasing can be effectively avoid, and clarity of the image is thus improved. Parameters of interpolation algorithm are calculated based on the 2K×1K signal, this improves the relevance between the interpolation pixel and the adjacent pixel, resulting in less image distortion and high interpolation efficiency. The present invention is simple and reliable, having wide application value.

The present invention further provides a resolution converting device which can correspond to any of the embodiments is the resolution converting method described above. In detail, referring to FIG. 5, the resolution converting device of the present embodiment includes a vertical diagonal interpolation parameter acquiring module 1, a horizontal diagonal interpolation parameter acquiring module 2, and a target resolution signal acquiring module 3. The vertical diagonal interpolation parameter acquiring module 1 is configured for acquiring a diagonal interpolation parameter matrix in the vertical direction. The horizontal diagonal interpolation parameter acquiring module 2 is configured for acquiring a diagonal interpolation parameter matrix in the horizontal direction. The target resolution signal acquiring module 3 is configure for performing a diagonal interpolation processing to the input signal that the resolution thereof is to be conversed to acquire a target resolution signal on basis of the diagonal interpolation parameter matrix in the vertical direction and the diagonal interpolation parameter matrix in the horizontal direction.

Referring to FIG. 5, in specific embodiment, the vertical diagonal interpolation parameter acquiring module 1 includes a vertical diagonal sampling module 11 and a vertical diagonal interpolation parameter acquiring module 12. The vertical diagonal sampling module 11 is configured for performing a diagonal sampling processing in the vertical direction to the input signal that the resolution thereof is to be conversed to acquire a first resolution signal. The vertical diagonal interpolation parameter acquiring module 12 is configured for performing a diagonal interpolation parameter calculation in the vertical direction in accordance with an interpolation algorithm on the basis of the input signal that the resolution thereof is to be conversed and the first resolution signal, to acquiring the diagonal interpolation parameter matrix in the vertical direction. Correspondingly, the horizontal diagonal interpolation parameter acquiring module 2 includes a horizontal diagonal sampling module 21 and a horizontal diagonal interpolation parameter acquiring module 22. The horizontal diagonal sampling module 21 is configured for performing a diagonal sampling processing in the horizontal direction to the first resolution signal to acquire a second resolution signal. The horizontal diagonal interpolation parameter acquiring module 22 is configured for performing a diagonal interpolation parameter calculation in the horizontal direction in accordance with an interpolation algorithm on the basis of the first resolution signal and the second resolution signal, to acquiring the diagonal interpolation parameter matrix in the horizontal direction.

Referring to FIG. 5, in specific embodiment, the target resolution signal acquiring module 3 includes a horizontal diagonal interpolating module 31 and a vertical diagonal interpolating module 32. The horizontal diagonal interpolating module 31 is configured for performing a diagonal interpolation processing in the horizontal direction to the input signal that the resolution thereof is to be conversed according to the diagonal interpolation parameter matrix in the horizontal direction, to acquiring a third resolution signal. The vertical diagonal interpolating module 32 is configured for performing a diagonal interpolation processing in the vertical direction to the third resolution signal according to the diagonal interpolation parameter matrix in the vertical direction, to acquiring the target resolution signal. Preferably, the target resolution signal acquiring module 3 further includes a frame buffering unit 33 which is configured for performing a delay buffering processing to the signal that the resolution thereof is to be conversed and that is input into the horizontal diagonal interpolating module 31. Further, the target resolution signal acquiring module 3 further includes an edge identifying and enhancing module 34 which is configure for performing an edge identifying and edge enhancing processing to the target resolution signal acquired by the vertical diagonal interpolating module 32.

The interpolation algorithm mentioned by the vertical diagonal interpolation parameter acquiring module 12, horizontal diagonal interpolation parameter acquiring module 22, horizontal diagonal interpolating module 31, and vertical diagonal interpolating module 32 is the same interpolation algorithm, for example, bilinear interpolation.

The resolution conversion device of the present invention is capable of converting 2K×1K signal to be 4K×2K signal, however it is not limited to the above described signals, for example, converting 4K×2K signal to be 8K×4K signal.

To sum up, the resolution conversion device of the present invention is capable of converting 2K×1K signal to be 4K×2K signal. By diagonal interpolating in the horizontal direction and the vertical direction in serial, image blur and image aliasing can be effectively avoid, and clarity of the image is thus improved. Parameters of interpolation algorithm are calculated based on the 2K×1K signal, this improves the relevance between the interpolation pixel and the adjacent pixel, resulting in less image distortion and high interpolation efficiency. The present invention is simple and reliable, having wide application value.

To clearly describe the goal, technical solution, and advantage of the present invention, the resolution converting method and device of the present invention will be described in detail via the embodiment of converting 2K×1K signal to 4K×2K signal. It should be understood that the embodiment is for explanation without any limitation.

Firstly, the input signal that the resolution thereof is to be converted is the 2K×1K progressive signal of YUV format. Define the pixel matrix to be PA, each pixel of the matrix PA to be PAmn, m is between, 1-1080, and n is between 1-1920. Take a pixel matrix having 4×4 pixel for example, it is shown in FIG. 2-1.

Referring to FIG. 5, 2K×1K progressive signal of YUV format is input into the vertical diagonal sampling module 11, vertical diagonal interpolation parameter acquiring module 12, and frame buffering unit 33.

Secondly, the vertical diagonal sampling module 11 performs a diagonal sampling processing in the vertical direction to the 2K×1K progressive signal of YUV format to acquire a 2K×0.5K diagonal interpolation sampling signal in the vertical direction, wherein the pixel matrix thereof is defined to be PB, each pixel of the pixel matrix PB is defined to be PBab, a is between 1-540, and b is between 1-1920. Then:

PBab=PAmn, and n=b; when b is odd, m=2a; when b is even, m=2a−1.

The diagonal interpolation sampling signal in the vertical direction acquired by sampling the signal shown in FIG. 2-1 is shown in FIG. 2-2.

Referring to FIG. 5, the vertical diagonal sampling module 11 outputs the 2K×0.5K diagonal interpolation sampling signal in the vertical direction to the horizontal diagonal sampling module 21, vertical diagonal interpolation parameter acquiring module 12, and horizontal diagonal interpolation parameter acquiring module 22.

Thirdly, the horizontal diagonal sampling module 21 performs a diagonal sampling processing in the horizontal direction to the 2K×0.5K signal to acquire a 1K×0.5K diagonal interpolation sampling signal in the horizontal direction, wherein the pixel matrix thereof is defined to be PC, each pixel of the pixel matrix PC is defined to be PCpq, p is between 1-540, and q is between 1-960. Then:

PCpq=PBab, and p=a; when p is odd, b=2q; when p is even, b=2q−1.

The diagonal interpolation sampling signal in the horizontal direction acquired by sampling the signal shown in FIG. 2-2 is shown in FIG. 2-3.

Referring to FIG. 5, the horizontal diagonal sampling module 21 outputs the 1K×0.5K diagonal interpolation sampling signal in the horizontal direction to the horizontal diagonal interpolation parameter acquiring module 22.

Fourthly, the vertical diagonal interpolation parameter acquiring module 12 receives the diagonal interpolation sampling signal in the vertical direction of the 2K×1K signal and the 2K×0.5K signal, performs a diagonal interpolation parameter calculation in the vertical direction in accordance with a interpolation algorithm, and acquires a diagonal interpolation parameter matrix V in the vertical direction. The parameter matrix V is a 2K×0.5K matrix. Define each unit of the parameter matrix V is Vcd, wherein c is between 1 and 540, and d is between 1 and 1920.

Define the function of the interpolation algorithm to be $f$, then:

$$PAmn=f(Vcd,Y);$$

m+n is even, and d=n; when d is odd, m=2c−1; when d is even, m=2c;

Y represents a number of pixel of the 2K×0.5K pixel matrix PB. For example, when the interpolation algorithm is a bilinear interpolation, Y represents the adjacent up, down, left, and right four pixels.

As the pixel values of the PAmn and Y are known, the Vcd can be calculated.

The parameter matrix V calculated from the pixel matrixes shown in FIGS. 2-1 and 2-2 is shown in FIG. 2-3.

Referring to FIG. 5, the vertical diagonal interpolation parameter acquiring module 12 outputs the parameter matrix V to the vertical diagonal interpolating module 32.

Fifth, the horizontal diagonal interpolation parameter acquiring module 22 receives the diagonal interpolation sampling signal in the vertical direction of the 2K×0.5K signal and the diagonal interpolation sampling signal in the horizontal direction of the 1K×0.5K signal, performs a diagonal interpolation parameter calculation in the horizontal direction in accordance with a interpolation algorithm, and acquires a diagonal interpolation parameter matrix H in the horizontal direction. The parameter matrix H is a 1K×0.5K matrix. Define each unit of the parameter matrix H is Hef, wherein e is between 1 and 540, and f is between 1 and 960.

Define the function of the interpolation algorithm to be $f$, then:

$$PBab=f(Hef,X);$$

a+b is even, and a=e; when e is odd, b=2f−1; when e is even, b=2f;

X represents a number of pixel of the 1K×0.5K pixel matrix PC. For example, when the interpolation algorithm is a bilinear interpolation, X represents the adjacent up, down, left, and right four pixels.

As the pixel values of the PBab and X are known, the Hef can be calculated.

The parameter matrix H calculated from the pixel matrixes shown in FIGS. 2-2 and 3-1 is shown in FIG. 3-2.

Referring to FIG. 5, the horizontal diagonal interpolation parameter acquiring module 22 outputs the parameter matrix H to the horizontal diagonal interpolating module 31.

Sixth, the frame buffering unit 33 performs a delay buffering processing to the to the 2K×1K signal that it receives, and outputs it to the horizontal diagonal interpolating module 31.

Seventh, the horizontal diagonal interpolating module 31 performs a diagonal interpolation processing in the horizontal direction to the 2K×1K signal to acquire a 4K×1K signal, wherein the pixel matrix thereof is defined to be PH, each pixel of the pixel matrix PH is defined to be PHkg, k is between 1 and 1080, and g is between 1 and 3840. Then:

1. Use the pixel PAmn of the 2K×1K pixel matrix PA to perform a horizontal diagonal filling to the matrix PH, that is:

PHkg=PAmn, and k=m; when m is odd, g=2n; when m is even, g=2n−1.

The horizontal diagonal filled matrix PH based on the pixel matrix show in FIG. 2-1 is shown in FIG. 4-1. The vacancies in FIG. 4-1 represent pixels to be filled.

2. Divide the matrix PH, that is, divide a 4K×1K matrix into 1K×0.5K pixel block matrixes each of which has 4×2 pixels, which can be referred to in FIG. 4-2, wherein the 32 pixels are divided into four pixel block matrixes A11, A12, A21, and A22 along the dotted lines.

3. Perform a horizontal diagonal interpolation calculation to the filled pixels of the matrix PH and a diagonal interpolation parameter matrix H in the horizontal direction, and fill the calculated pixel values to corresponding vacancies in the matrix PH, that is:

Define the function of the interpolation algorithm to be $f$, and then the pixel value calculated from the interpolation is:

$$PHkg=f(Hef,L);$$

k+g is even;

The parameter Hef corresponds to each pixel block matrix, for example, referring to FIG. 4-2: Hef is H11 when calculate the pixel value of the pixel block matrix A11, Hef is H12 when calculate the pixel value of the pixel block matrix A12, Hef is H21 when calculate the pixel value of the pixel block matrix A21, Hef is H22 when calculate the pixel value of the pixel block matrix A22.

L represents a number of pixels of the matrix PH that are to be calculated, for example, when the interpolation algorithm is a bilinear interpolation, to calculate the pixel value of PH22, when L is PH12, PH21, PH32, PH23, then PH22=$f$ (PH11, PH12, PH21, PH32, PH23).

When the interpolation in FIG. 4-2 has been filled, the matrix PH is shown in FIG. 4-3. The X11 and X12 in FIG. 4-3 are filled pixels after horizontal diagonal interpolation calculation.

Referring to FIG. 5, the horizontal diagonal interpolating module 31 outputs the 4K×1K pixel matrix PH which has been interpolated to the vertical diagonal interpolating module 32.

Eighth, the vertical diagonal interpolating module 32 performs a diagonal interpolation processing in the vertical direction to the 4K×1K signal to acquire a 4K×2K signal, wherein the pixel matrix thereof is defined to be PV, each pixel of the pixel matrix PV is defined to be PHst, s is between 1-2160, and t is between 1-3840. Then:

1. Use the pixel PHkg of the 4K×1K pixel matrix PH to perform a vertical diagonal filling to the matrix PV, that is: PVst=PHkg, and t=g; when g is odd, s=2k; when g is even, s=2k−1.

The vertical diagonal filled matrix PV based on the pixel matrix show in FIG. 4-3 is shown in FIG. 4-4. The vacancies in FIG. 4-4 represent pixels to be filled.

2. Divide the matrix PV, that is, divide a 4K×2K matrix into 2K×0.5K pixel block matrixes each of which has 4×2 pixels, which can be referred to in FIG. 4-5, wherein the 64 pixels are divided into four pixel block matrixes B11, B12, B13, B14, B21, B22, B23, and B24 along the dotted lines.

3. Perform a vertical diagonal interpolation calculation to the filled pixels of the matrix PV and a diagonal interpolation parameter matrix V, and fill the calculated pixel values to corresponding vacancies in the matrix PV, that is:

Define the function of the interpolation algorithm to be $f$, and then the pixel value calculated from the interpolation is:

$$PVst=f(Vcd,W);$$

s+t is even;

The parameter Vcd corresponds to each pixel block matrix, for example, referring to FIG. 4-5: Vcd is V11 when calculate the pixel value of the pixel block matrix B11, Vcd is V12 when calculate the pixel value of the pixel block matrix B12, Vcd is V13 when calculate the pixel value of the pixel block matrix B13, . . . ;

W represents a number of pixels of the matrix PV that are to be calculated, for example, when the interpolation algorithm is a bilinear interpolation, to calculate the pixel value of PV22, when W is PV12, PV21, PV32, PV23, then PV22=$f$ (PV11, PV12, PV21, PV32, PV23).

Figure 6:
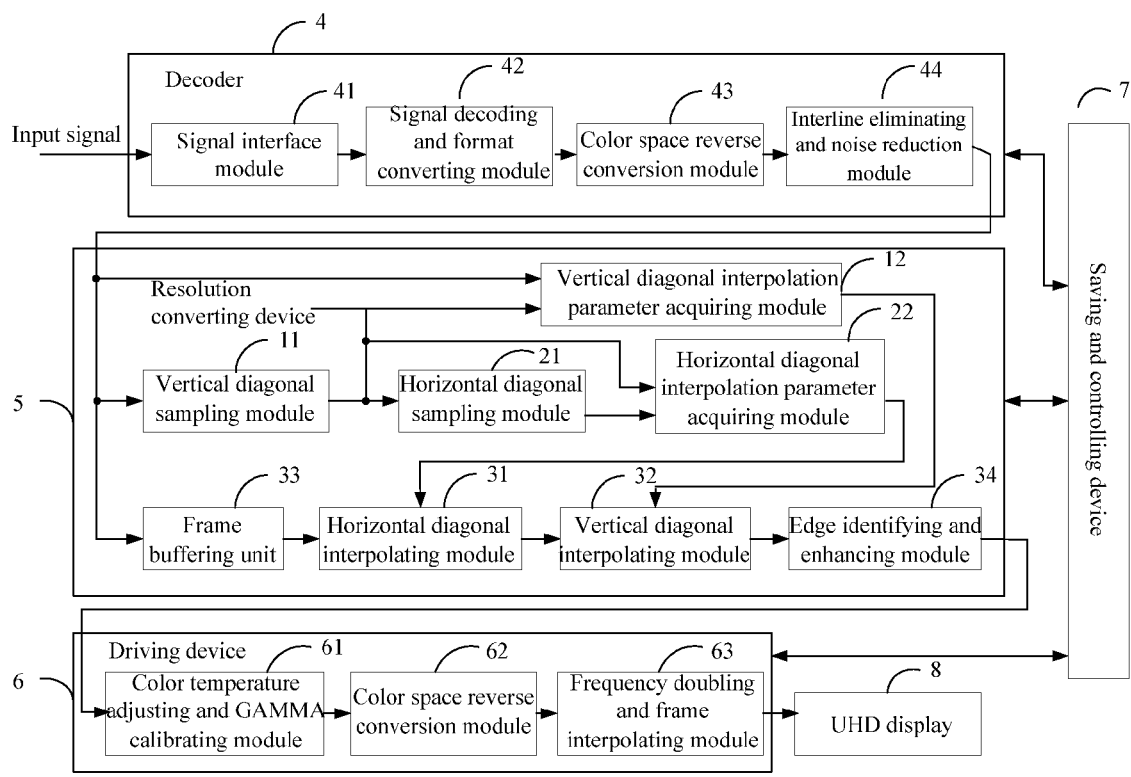

When the interpolation in FIG. 4-5 has been filled, the matrix PV is shown in FIG. 4-6. The Y11 and Y12 in FIG. 4-6 are filled pixels after vertical diagonal interpolation calculation.

Ninth, the vertical diagonal interpolating module 32 outputs the 4K×2K pixel matrix after the interpolation has been finished, and the edge identifying and enhancing module 34 performs an edge identifying and edge enhancing processing to the 4K×2K pixel matrix, to avoid image blur and image aliasing and further improve clarity of the image. The 4K×2K pixel matrix is output and the 2K×1K to 4K×2K pixel matrix converting process is finished.

The 2K×1K means 1920×1080, that is, there are 1080 rows which each row has 1920 pixels. The 2K×0.5K means 1920×540, that is, there are 540 rows which each row has 1920 pixels. The 1K×0.5K means 960×540, that is, there are 540 rows which each row has 960 pixels. The 4K×1K means 3840×1080, that is, there are 1080 rows which each row has 3840 pixels. The 4K×2K means 3840×2160, that is, there are 2160 rows which each row has 3840 pixels.

The present invention further provides a Ultra High-Definition Television (UHDTV), referring to FIG. 6, it includes a decoder 4, a resolution converting device 5, a driving device 6, a saving and controlling device 7, and a UHD display 8. The decoder 4 is configured for decoding and converting received signal, and outputting 2K×1K progressive signal of YUV format to the resolution converting device 5. The resolution converting device 5 is configured for converting the 2K×1K progressive signal of YUV format to be 4K×2K progressive signal of YUV format, it is anyone of the resolution converting devices described above and will not be described again here. The driving device 6 is configured for performing color temperature adjust, GAMMA calibration, color space reverse conversion, and double frequency and frame interpolating process to the 4K×2K progressive signal of YUV format, and outputting a 4K×2K double frequency progressive signal of RGB format to the UHD display 8. The saving and controlling device 7 is configured for controlling the decoder 4, resolution converting device 5, and driving device 6, and saving data of the decoder 4, resolution converting device 5, and driving device 6. The UHD display 8 is configured for receiving the 4K×2K double frequency progressive signal of RGB format and driving the driving UHD display 8 to realize HUD display.

Specifically, the decoder 4 includes a signal interface module 41, a signal decoding and format converting module 42, a color space reverse conversion module 43, and an interline eliminating and noise reduction module 44. The signal interface module 41 is configured for receiving an input signal, performing signal amplitude limitations, format recognizing processing to the input signal, and outputting the processed signal to the signal decoding and format converting module 42. The signal decoding and format converting module 42 is configured for receiving signal form the signal interface module 41, performing decode, format conversion processing to the received signal so that it is processed to be 2K×1K signal, and outputting it the color space reverse conversion module 43. The color space reverse conversion module 43 is configured for receiving the 2K×1K signal form the signal decoding and format converting module 42, processing the color gamut of the 2K×1K signal so that it is processed to be 2K×1K signal of YUV4:2:2 format, and outputting it to the interline eliminating and noise reduction module 44. The interline eliminating and noise reduction module 44 is configured for receiving the 2K×1K signal of YUV4:2:2 format from the color space reverse conversion module 43, performing a de-interlace and noise reduction processing so that it is processed to be 2K×1K progressive signal of YUV4:2:2 format, and outputting it to the resolution converting device 5.

Specifically, the driving device 6 includes a color temperature adjusting and GAMMA calibrating module 61, a color space reverse conversion module 62, and a frequency doubling and frame interpolating module 63. The color temperature adjusting and GAMMA calibrating module 61 receives the 4K×2K progressive signal of YUV format from the edge identifying and enhancing module 34; performs a color temperature adjust within the YUV color space and GAMMA calibration, for example, maintain Y and adjust UV when adjusting color temperature, only calibrate Y and fine tuning the YUV; and outputs the 4K×2K progressive signal of YUV format to the color space reverse conversion module 62. The color space reverse conversion module 62 receives the 4K×2K progressive signal of YUV format, reverses its color space so that it is converted into 4K×2K progressive signal of RGB format, and outputs it to the frequency doubling and frame interpolating module 63. The frequency doubling and frame interpolating module 63 receives the 4K×2K progressive signal of RGB format, performs frame interpolation, frequency doubling so that the frame frequency thereof is doubled or more, and outputs the 4K×2K progressive signal of RGB format having double frequency to the UHD display 8.

Specifically, the saving and controlling device 7 mainly outputs and receives controlling signal to control each module of the decoder 4, each module of the resolution converting device 5, each module of the driving device 6, and saves frame and data of each module of the decoder 4, each module of the resolution converting device 5, each module of the driving device 6 to realize image processing and signal conversion.

The UHDTV of the present invention is capable of converting 2K×1K signal to be 4K×2K signal, however it is not limited to the above described signals, for example, converting 4K×2K signal to be 8K×4K signal.

To sum up, the UHDTV of the present invention is capable of converting 2K×1K signal to be 4K×2K signal. By diagonal interpolating in the horizontal direction and the vertical direction in serial, image blur and image aliasing can be effectively avoid, and clarity of the image is thus improved. Parameters of interpolation algorithm are calculated based on the 2K×1K signal, this improves the relevance between the interpolation pixel and the adjacent pixel, resulting in less image distortion and high interpolation efficiency. The present invention is simple and reliable, having wide application value.

The above-mentioned is only preferred embodiments of the invention, and shall not be regarded as limitations of the patent range of the invention. All equivalent structures or flow transformations and modifications or direct or indirect applications.

Furthermore, it is apparent to those skilled in the art that the present disclosure also provides a resolution converting device, the resolution converting device comprising a non-transitory program storage medium and one or more processors. The non-transitory program storage medium stores program code executable by the at least one processor to perform the methods as described above. Furthermore, it is apparent to those skilled in the art that various units or modules 1, 2, 3, 11, 12, 21, 22, 31, 32, 33, and 34, as shown in FIGS. 5-6, can be software modules or software units. In another aspect, it is well-known that various software modules or software units inherently can be stored in the non-transitory program storage medium and executed by the at least one processor.

What is claimed is:

1. A resolution conversion method, comprising:
acquiring a diagonal interpolation parameter matrix in a vertical direction and a diagonal interpolation parameter matrix in a horizontal direction;
performing diagonal interpolation processing to an input signal that a resolution thereof is to be converted to acquire a target resolution signal on basis of the diagonal interpolation parameter matrix in the vertical direction and the diagonal interpolation parameter matrix in the horizontal direction, so that through either of the diagonal interpolation in the horizontal direction and the diagonal interpolation in the vertical direction, pixels that are aligned in each vertical line or horizontal line before the diagonal interpolation are unaligned in a vertical line or horizontal line after the diagonal interpolation.

2. The resolution conversion method of claim 1, wherein said acquiring the diagonal interpolation parameter matrix in the vertical direction comprising:
performing a diagonal sampling processing in the vertical direction to the input signal that the resolution thereof is to be converted to acquire a first resolution signal;
performing a diagonal interpolation parameter calculation in the vertical direction in accordance with an interpolation algorithm on the basis of the input signal that the resolution thereof is to be converted and the first resolution signal, to acquire the diagonal interpolation parameter matrix in the vertical direction.

3. The resolution conversion method of claim 2, wherein said acquiring the diagonal interpolation parameter matrix in the horizontal direction comprising:
performing a diagonal sampling processing in the horizontal direction to the first resolution signal to acquire a second resolution signal;
performing a diagonal interpolation parameter calculation in the horizontal direction in accordance with an interpolation algorithm on the basis of the first resolution signal and the second resolution signal, to acquire the diagonal interpolation parameter matrix in the horizontal direction.

4. The resolution conversion method of claim 1, wherein said performing a diagonal interpolation processing to the input signal that the resolution thereof is to be converted to acquire the target resolution signal on basis of the diagonal interpolation parameter matrix in the vertical direction and the diagonal interpolation parameter matrix in the horizontal direction comprises:
performing a diagonal interpolation processing in the horizontal direction to the input signal that the resolution thereof is to be converted according to the diagonal interpolation parameter matrix in the horizontal direction, to acquire a third resolution signal;
performing a diagonal interpolation processing in the vertical direction to the third resolution signal according to the diagonal interpolation parameter matrix in the vertical direction, to acquire the target resolution signal.

5. The resolution conversion method of claim 4, wherein:
said performing a diagonal interpolation processing in the horizontal direction to the input signal that the resolution thereof is to be converted according to the diagonal interpolation parameter matrix in the horizontal direction, to acquire the third resolution signal comprises:

performing a horizontal diagonal filling to pixels of a pixel matrix of the signal that the resolution thereof is to be converted to acquire a first matrix;

dividing the first matrix; and performing a horizontal diagonal interpolation calculation to the filled pixels of the first matrix and the diagonal interpolation parameter matrix in the horizontal direction, and filling the calculated pixel values to corresponding vacancies in the first matrix to acquire the third resolution signal;

said performing a diagonal interpolation processing in the vertical direction to the third resolution signal according to the diagonal interpolation parameter matrix in the vertical direction, to acquire the target resolution signal comprises:

performing a vertical diagonal filling to pixels of a pixel matrix of the third resolution signal to acquire a second matrix;

dividing the second matrix;

performing a vertical diagonal interpolation calculation to the filled pixels of the second matrix and the diagonal interpolation parameter matrix in the vertical direction, and filling the calculated pixel values to corresponding vacancies in the second matrix to acquire the target resolution signal.

6. A resolution converting device, comprising at least one processor and a non-transitory program storage medium containing program code executable by the at least one processor, the program code comprising:

a vertical diagonal interpolation parameter acquiring module configured for acquiring a diagonal interpolation parameter matrix in the vertical direction;

a horizontal diagonal interpolation parameter acquiring module configured for acquiring a diagonal interpolation parameter matrix in the horizontal direction; and a target resolution signal acquiring module configured for performing a diagonal interpolation processing to a signal that the resolution thereof is to be converted to acquire a target resolution signal on basis of the diagonal interpolation parameter matrix in the vertical direction and the diagonal interpolation parameter matrix in the horizontal direction, so that through either of the diagonal interpolation in the horizontal direction and the diagonal interpolation in the vertical direction, pixels that are aligned in each vertical line or horizontal line before the diagonal interpolation are unaligned in a vertical line or horizontal line after the diagonal interpolation.

7. The resolution converting device of claim 6, wherein the vertical diagonal interpolation parameter acquiring module comprises:

a vertical diagonal sampling module configured for performing a diagonal sampling processing in the vertical direction to the signal that the resolution thereof is to be converted to acquire a first resolution signal; and a vertical diagonal interpolation parameter acquiring module configured for performing a diagonal interpolation parameter calculation in the vertical direction in accordance with an interpolation algorithm on the basis of the signal that the resolution thereof is to be converted and the first resolution signal, to acquire the diagonal interpolation parameter matrix in the vertical direction.

8. The resolution converting device of claim 7, wherein the horizontal diagonal interpolation parameter acquiring module comprises:

a horizontal diagonal sampling module configured for performing a diagonal sampling processing in the horizontal direction to the first resolution signal to acquire a second resolution signal; and a horizontal diagonal interpolation parameter acquiring module configured for performing a diagonal interpolation parameter calculation in the horizontal direction in accordance with an interpolation algorithm on the basis of the first resolution signal and the second resolution signal, to acquire the diagonal interpolation parameter matrix in the horizontal direction.

9. The resolution converting device of claim 6, wherein the target resolution signal acquiring module comprises:

a horizontal diagonal interpolating module configured for performing a diagonal interpolation processing in the horizontal direction to the signal that the resolution thereof is to be converted according to the diagonal interpolation parameter matrix in the horizontal direction, to acquire a third resolution signal; and a vertical diagonal interpolating module configured for performing a diagonal interpolation processing in the vertical direction to the third resolution signal according to the diagonal interpolation parameter matrix in the vertical direction, to acquire the target resolution signal.

10. The resolution converting device of claim 9, wherein the target resolution signal acquiring module further comprises:

a frame buffering unit configured for performing a delay buffering processing to the signal that the resolution thereof is to be converted and that is input into the horizontal diagonal interpolating module.

11. The resolution converting device of claim 10, wherein the target resolution signal acquiring module further comprises:

an edge identifying and enhancing module configured for performing an edge identifying and edge enhancing processing to the target resolution signal acquired by the vertical diagonal interpolating module.

12. An Ultra High-Definition Television, comprising:

a decoder configured for decoding and converting received signal, and outputting 2K×1K progressive signal of YUV format:

a resolution converting device of any one of the claims 6 to 11, configured for converting the 2K×1K progressive signal of YUV format to be 4K×2K progressive signal of YUV format;

a driving device configured for performing color temperature adjustment, GAMMA calibration, color space reverse conversion, and double frequency and frame interpolating process to the 4K×2K progressive signal of YUV format, and outputting a 4K×2K double frequency progressive signal of RGB format; and a saving and controlling device configured for controlling the decoder, resolution converting device, and driving device, and saving data of the decoder, resolution converting device, and driving device.

* * * * *